United States Patent Office 3,558,300
Patented Jan. 26, 1971

3,558,300
FOLIAR FERTILIZATION WITH AMMONIUM POLYPHOSPHATE
Joachim J. Wagner, Morristown, N.J., assignor to Allied Chemical Corporation, New York, N.Y., a corporation of New York
No Drawing. Filed Mar. 14, 1969, Ser. No. 807,452
Int. Cl. C05b *11/12*
U.S. Cl. 71—34                                    7 Claims

ABSTRACT OF THE DISCLOSURE

Foliar application of aqueous solutions of ammonium polyphosphate to field crops which have received adequate ground applications of essential plant nutrients affords a significant increase in crop yield and resistance to normal and superimposed stress in comparison with additional conventional ground application of solid or liquid phosphate-containing fertilizers.

BACKGROUND OF THE INVENTION

This application relates to the foliar application of ammonium polyphosphate solutions to field crops.

More particularly, this application is directed to the foliar application of ammonium polyphosphate fertilizer solution to field crops to improve the growth rate, stress resistance, and maximum planting density of such crops.

The ground application of fertilizer and, in particular, of phosphate-containing fertilizers such as ammonium phosphate to increase crop yields is, of course, well known. In the case of seed-grown annual crops, such phosphate-containing fertilizers can be applied in either liquid or solid form prior to, simultaneously with, or subsequent to, the planting of the seeds from which the crops will grow. Such fertilizers are generally of the type wherein the phosphate is rendered assimilable by the plant through the action of soil bacteria so as to provide for assimilation by the plant over a prolonged period.

The purpose of fertilizer application is, of course, to increase the crop output per unit of land. Since phosphorous, which is assimilated by the plant as phosphate ion, is one of the essential elements required in major amounts for plant growth, one of the limiting factors in determining the size and the number of plants that can grow to maturity on a given area of land is the amount of phosphorous available to the plant during its growth cycle from seed to maturity. Since virtually all soils naturally contain a comparatively limited amount of phosphorous, in general, the greater the amount of added phosphorous, the greater the number of plants which will grow on a given piece of land. This is subject to three qualifications: (1) Phosphorous is, of course, not the only essential element for plant growth. Other elements required by plants in comparatively large quantity are nitrogen, potassium, calcium, magnesium, and sulfur. Also, the so-called micronutrients, i.e., copper, zinc, manganese, molybdenum, chlorine, boron, and iron must also be present albeit in comparatively limited amount; (2) The phosphorous must be present in a form that is either directly assimilable by the plant (phosphate anion) or, alternatively, is transformable by water and soil bacteria into such assimilable form; (3) A saturation point is ultimately reached beyond which additional quantities of soil-applied phosphorous achieve a very limited increase in the crop yield per unit of land. The saturation point, of course, varies depending upon the particular crop, the soil, and climatic conditions, the availability of water and sunlight, temperature, and the like. However, even under conditions of abundant water, sunshine, etc., a point is reached after which further addition of phosphate fertilizer to the soil only marginally increases crop output. The point of diminishing economic returns is almost invariably reached before this saturation point is reached; that is, the additional phosphorous-containing fertilizer and its application costs more than the increased crop output is worth.

Other factors, beside insufficient nutrients, that also tend to decrease crop yield, notwithstanding abundant water, sunshine and minerals, include plant diseases, e.g., fungi.

In view of the fact that the world faces a rapidly increasing population and a very slowly increasing quantity of arable land, it is obvious that any development that practicably increases the output of field crops per unit of land is highly desirable.

It is an object of this invention to provide such a practicable process for increasing the yield of field crops.

It is a further object of this invention to provide a process for rendering field crops more resistant to normal and superimposed stresses such as drought, plant diseases, and high-planting density.

Further objects and advantages will become apparent from the description of the invention which follows in greater detail.

The term crop as used in the instant application connotes a plurality of plants of the same type growing together.

The term field crops as used in the instant application connotes annual, seed-grown grain food plants.

In conventional modern farming practice, sufficient essential nutrients are added each year to replenish that which the previous year's crop removed, i.e., assimilated, plus a "bonus" or "insurance" of about 25% more. This amount of fertilization is conventionally referred to as "adequate ground fertilization." The requisite amount for a given field crop and crop planting density is generally determined by soil analysis and by trial and error tests performed by universities and by the U.S. Department of Agriculture. In general, adequate ground fertilization corresponds approximately to the point of diminishing returns in fertilizer. That is, 25 to 50% more fertilizer results in only a 2 to 10% increase in crop output for a given planting density. A similar point of diminishing returns is also reached in planting density after which, even with adequate quantities of fertilizer for the greater number of plants present, comparatively little increase in crop yield occurs. The point of diminishing returns in planting density means that, for example, if with a planting density of 12,000 plants per acre the crop yield will be 100 bushels per acre using adequate ground fertilization, a planting density of 15,000 plants per acre will produce very little more than 100 bushels per acre even with much greater (25% increase) ground fertilization, e.g., about 112 bushels per acre. Thus, about 12,000 plants per acre is the point of diminishing returns since a 25% increase in plants and fertilization affords only a 12% increase in crop yield.

It has now been found in accordance with this invention that the foliar application of aqueous ammonium polyphosphate solution to growing field crops substantially increases the stress resistance of such crops when such foliar application is in conjunction with conventional, adequate ground application of fertilizer containing nitrogen, phosphorous, potassium, and other essential nutrients. Such increased stress resistance allows a significant increase in economically practicable maximum crop yield per unit of land. Additionally, foliar application of ammonium polyphosphate solution, in conjunction with conventional ground application of fertilizer, is more efficient than additional ground application; that is, there is a greater increase in crop yield per pound of applied phosphate when a portion of such phosphate is foliar applied.

This invention is, therefore, directed to foliar application of aqueous ammonium polyphosphate solution to growing field crops conjointly with adequate ground application.

For absorption by plants, minerals must be in aqueous solution since the minerals enter the plants as dissociated ions. Application to the soil is the conventional means of fertilizer application since plants readily assimilate, i.e., absorb, these needed mineral nutrients in aqueous solution through the roots. It is, of course, known to make ground applications of both the older orthophosphate-type fertilizer solutions as well as the newer polyphosphate solutions to fertilize virtually every type of crop. However, because, as hitherto indicated, plants generally absorb the essential mineral nutrients through their roots, application of solutions of one or more of the essential nutrients to any part of the plant above the ground is fairly uncommon. That certain micronutrients, e.g., iron or zinc, can advantageously be foliar applied to fruit trees or certain types of berries or vegetables has been known for many years. The foliar application of fertilizer solutions containing nitrogen, potassium, and orthophosphate to orchards or berry patches on a repeat basis during the period in which the actual fruit or berries are developing for the purpose of enhancing the appearance and size of the fruit is also known. Likewise, it is known that repeated foliar application of nitrogen, potassium, and orthophosphate to growing sugar cane affords cane of higher sugar content. The foliar treatment of soybeans with urea phosphate is reported in U.S. Pat. No. 3,087,806. Foliar application of plain urea has been practiced on a wide variety of fruit and vegetables. However, these previous foliar applications of phosphate-containing fertilizers differ from the process of the instant invention in several crucial particulars:

(1) Most previous instances of foliar applications of major plant nutrients have been to plants of a type other than field crops. Examples of field crops which can advantageously be treated by the process of the instant invention include corn, wheat, sorghum, soybean, rye, millet, barley, milo, and triticale. Obviously, fruit trees, berries and sugar cane which, for example, unlike field crops, are perennial, differ significantly from such crops.

The prior art has frequently taught that, in general, foliar applications of fertilizer to field crops that have adequate ground fertilization is virtually useless. See, for example, Brasher, E. G., J. R. Wheatley and W. L. Olgle, Foliar Nutrition Sprays on Vegetable Crops, Delaware Agr. Exp. Sta. Bull. 295, 1953; and Mederski, H. L. and G. W. Volk, Foliar Fertilization of Field Crops, Ohio Agr. Exp. Sta. Research Circ. 35, p. 12, 1956.

(2) All previous instances of foliar application of phosphate solutions have been of orthophosphates. The reason for this has been that the prior art teaches that polyphosphates must be hydrolyzed to the orthophosphate form in order to be absorbable by any part of the plant. With ground application of fertilizer, such hydrolysis takes place gradually under the influence of soil bacteria and a slow-release fertilizer is thereby provided. However, when applied to the foilage out of contact with the soil, polyphosphates were hitherto believed to be essentially nonhydrolyzable and, hence, completely incapable of utilization by the plant.

(3) Previous foliar applications of orthophosphate, e.g., to fruit orchards, berries, sugar cane, and soybean plants, have involved repeated applications throughout the growing season, and in such cases a single or a few applications were found to be essentially ineffective.

In contradistinction, I have found that the application on a single occasion or, at the most, a very limited number of occasions, to growing field crops of ammonium polyphosphate fertilizer solutions has a number of completely unexpected beneficial effects, specifically, the resistance to both normal and induced stress of the thus-treated field crops is significantly increased. By stress I mean the subjecting of the plant to conditions inimical to growth.

The most common types of normal stress are drought, toxic elements, and infectious pathogens.

By drought is meant that for a greater or lesser period of time during its growth cycle the plant receives insufficient water. The effect of extremely prolonged drought is, of course, that the plant dies. Nonfatal, i.e., partial drought, results in plants of reduced size and a higher percentage of barren plants. On field crops, using corn as an example, the effects of partial drought is that a corn field will have fewer stalks with ears and many of the ears that do form will be smaller than those in an adjacent field planted with the same number of identical type corn seeds but which have received sufficient water. While unduly prolonged lack of water will, of course, kill any field crop, I have found that foliar application of ammonium polyphosphate solution will increase the resistance of the crop to partial drought; that is, using corn again as an example, if two substantially identical segments of a corn field, planted with an equal quantity of identical type of seed, experience during the corn growth period partial drought and the growing corn of one segment of the field has been foliar treated with ammonium polyphosphate solution, the thus-treated segment will afford a substantially greater quantity of ears of corn of larger size than the nontreated segment. Of course, this assumes that both segments have received adequate ground application of all essential nutrients.

The other normal stress commonly affecting crops is disease. It is estimated that the annual field crop output in the United States is reduced 10% by plant diseases of all sorts, thus representing an annual loss of over 3 billion dollars. Such diseases are the result of attack of the plants by a variety of pathogenic living organisms, including viruses, bacteria, and fungi. Common diseases affecting field crops include, for example, wheat rust; wheat bunt; corn, oat and barley smut; charcoal rot of corn and sorghum; diplodia or gibberella stalk rot; pytheum root rot; and Northern corn leaf blight (Stewart's disease). While treatment of crops in accordance with my invention is not a cure for any plant disease, I have found that treatment of field crops by my process does significantly increase the resistance to infection of such crops to many diseases and thereby reduces the scope and severity of such infection as does occur. For example, I have found that the resistance of corn to smut is substantially increased by the foliar treatment of corn with ammonium polyphosphate, i.e., a corn field, which has received a foliar application of ammonium polyphosphate in accordance with my invention, is less likely to be infected by smut than an adjacent corn field not so treated and, further, even in cases where the foliar-treated field does become infected, a much lower percentage of plants will be infected than in an adjacent nontreated field.

Another normal stress that may occasionally occur is the presence of toxic elements in the soil. Such toxic elements may be formed by the bacterial breakdown of plant residues in the soil or may be due to excessive quantities of naturally present or added metals such as copper or manganese. Also, very high retained quantities of ammonia in the soil such as can occur when unusually high rainfall occurs after application of anhydrous ammonia are toxic to most field crops.

Excessive soil compaction or flooding reduces the amount of oxygen in the soil and, hence, microbial activity, which in turn prevents the microbial breakdown of these toxic elements. Foliar application of ammonium polyphosphate enhances the resistance of crops to these other types of normal stress; that is, foliar application of ammonium polyphosphate results in fewer killed, stunted, or barren plants as a result of toxicity in the soil caused by metals, ammonia, soil compaction, or flooding.

The most common type of induced stress is extraordinarily high planting density. An extraordinarily high planting density for field crops results in weak, spindly plants notwithstanding ground fertilization. However, I have found that foliar fertilization enables economically practical planting densities of up to about 20% greater than in the absence of foliar fertilization for a given crop and field.

As has hitherto been pointed out, for any given crop and unit of land, a point is reached after which additional quantities of ground-applied fertilizer and/or seed will produce little or no increase in crop yield. The maximum economic yield is reached substantially before this point, i.e., the value of the additional crop produced is less than the cost of the additional ground-applied fertilizer and/or seed. For example, a given acre of land may have an absolute maximum output of 200 bushels of corn regardless of how much ground-applied fertilizer and seed are used and an economic maximum of about 140 bushels. Foliar application of ammonium polyphosphate solution in accordance with my invention increases both these maximums.

The increase in absolute maximum yield is readily understood, but it is generally not of great practical significance because of the financial penalty it imposes. What this means is that for the field having a maximum of 200 bushels using ground-applied fertilizer the output can be increased to about 200 bushels by the concomitant addition of foliar-applied ammonium polyphosphate.

However, of great practical importance is the fact that my process increases the maximum economic yield of a given field. That is, foliar fertilization by my process costs less than the value of the increased crop output resulting therefrom even after the point of negative economic return has been reached for exclusively ground application of fertilizer. In the practice of my invention, it is contemplated that conventional ground application to the field crop of all necessary plant nutrients will be carried out up to the approximate point where it is ascertained that further ground application of fertilizer will cost more than the value of the additional crops produced because of an increasing number of stunted or nonmaturing plants. Foliar application of ammonium polyphosphate will, however, afford up to 20% more crops. These crops will have a value greater than the cost of the foliar-applied ammonium polyphosphate.

It should be emphasized that a significant advantage to treatment of field crops in accordance with my invention is the fact that ammonium polyphosphate is completely nontoxic to plants, animals, and humans when applied topically at the hereinafter indicated dosages.

The term crop growth period as used in the instant application connotes the period from the time the plant first sprouts until the plant is harvested. The period of time from planting of the seed to when the plant first sprouts above the ground is, in contrast, known in the art as the germination stage or period.

The term ammonium polyphosphate as used in the instant application connotes the reaction product of ammonia with super phosphoric acid. Such super phosphoric acid is made by treating phosphate rock with sulfuric acid, phosphoric acid, or a mixture thereof. Such phosphate rock comprises mainly calcium phosphate, plus small amounts of iron and aluminum phosphates. Polyphosphoric acid has the structure:

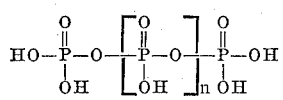

wherein $n$ can range from about 0 to 10. When $n=0$, the material is denominated pyrophosphoric acid. Orthophosphoric acid, in contradistinction, has the structure:

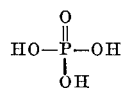

Polyphosphoric acid is formed by the dehydration of orthophosphoric acid.

The superphosphoric acid used in preparing the ammonium polyphosphate of the instant invention as obtained from phosphate rock generally comprises a mixture of ortho- and polyphosphoric acid with at least about 50% of the phosphorous being in the polyphosphate form.

In the practice of the instant invention, the ammonium polyphosphate is applied to the crop foliage as an aqueous solution. A suitable solution concentration level is about 10–35 weight percent, preferably 20–30 weight percent, ammonium polyphosphate in water. A suitable treating level for field crops ranges from about 5–20 pounds, preferably 10–15 pounds, of phosphorous, computed as $P_2O_5$, per acre. This is equivalent to 4–6 gallons per acre of a 20% ammonium polyphosphate solution.

If desired, for reasons of economy and efficiency, other essential plant nutrient ingredients such as potassium, sulfur, magnesium, and calcium, and the aforementioned micronutrients can also be present in the ammonium polyphosphate solution being applied. For example, the solution can suitably also contain potassium as KCl and also calcium and magnesium sulfate and copper, zinc, molybdenum, and iron in the form of their sulfate salts.

In view of its well known chelating effect, such ammonium polyphosphate solution is particularly advantageously used conjointly with the aforementioned micronutrients in the form of their water-soluble sulfate salts.

Various pesticides, fungicides, and the like, can also be present in the treating solution if desired.

The most convenient means for treating field crops in accordance with my invention is spraying the ammonium polyphosphate solution onto such crops by airplane as is well known for the application of liquid pesticides and other type fertilizer solutions. However, in underdeveloped countries or in areas where aerial spraying is impractical, the ammonium polyphosphate solution can be sprayed on from trucks or even with hand-spraying equipment.

Such treatment can advantageously be carried out from about one up to about three times during the crop-growing season.

The most advantageous time for application will vary with the crop and the particular objective desired. If the predominant or sole objective is to increase crop yield by providing sufficient assimilable phosphate in the most efficient fashion, then application may suitably be carried out at any time after the onset of the crop growth period at which the plant has sufficient foliage upon which to deposit the applied ammonium polyphosphate solution up to the flowering (gamete formation) period. For most field crops, harvesting generally takes place from 6–8 weeks after flowering. The flowering period is referred to as tasselling in corn or heading in wheat. Wheen it is desired to enhance the resistance of the crops to infectious pathogens, the foliar application should, wherever practicable, precede exposure to such pathogens, by about four to ten days. When the main stress whose effects it is sought to obviate is insufficient soil oxygen or the presence of toxic elements in the soil, the foliar application should be during or immediately after the stress period, most preferably during. With respect to the induced stress of high planting density, the optimum application time is six to ten weeks after the onset of the growth period.

The following specific examples further illustrate my invention.

In all of the following examples, the per acre ground application level of nitrogen-, phosphorous- and potassium-containing fertilizer is expressed as pounds of nitrogen, $P_2O_5$ and $K_2O$, respectively. This is in accordance with general practice. However, it should be noted that actual application of these elements was in the form of ammonium polyphosphate, calcium phosphate and potassium chloride, respectively. Foliar application rates are also expressed as pounds of $P_2O_5$ per acre, although the fertilizer is applied as an aqueous ammonium polyphosphate solution, as heretofore indicated. The one exception is Example 7, wherein the ground application of nitrogen was in form of anhydrous ammonia. Additionally, in every example, all fields received an adequate amount of essential micronutrients by ground application.

EXAMPLE 1

A corn field in North Dakota having a crop density of 12,000 corn plants per acre was divided in seven approximately equally sized segments.

Segment A was planted at a rate of 12,000 plants an acre. The ground application level of nitrogen, phosphorous and potassium-containing fertilizer was as follows: 150 lb. of nitrogen, 70 lb. of $P_2O_5$ and 80 lb. of $K_2O$. At harvest, this segment afforded 100 bushels of corn an acre.

Segment B was planted with 15,000 plants an acre. The ground application level of fertilizer was the same as in Segment A. The yield was 80 bushels an acre.

Segment C was also planted with 15,000 plants an acre, but the ground-applied fertilizer was at the level of 200 lb. of nitrogen; 100 lb. of $P_2O_5$ and 100 lb. of $K_2O$. The crop yield was 110 bushels of corn an acre.

Segment D was planted with 12,000 plants an acre but the ground-applied fertilization level was the same as in Segment C. The crop yield was 103 bushels of corn an acre.

It is thus apparent that 12,000 plants an acre is approximately the maximum economic planting density using only the ground-applied fertilizer for this field and crop. The maximum economic ground fertilization level is approximately 150 lb. of nitrogen, 80 lb. of $P_2O_5$ and 80 lb. of $K_2O$.

Segment E was planted with 15,000 plants an acre. The same quantity of fertilizer was ground applied as in Segment A. However, additionally, 10 lb. an acre of $P_2O_5$ was foliar applied as a 20% aqueous ammonium polyphosphate solution to the corn foliage by a crop-spraying plane at the onset of tasselling. The crop yield was 115 bushels of corn an acre.

In segment F, the planting density and ground application rate of fertilizer was the same as in Segment C. However, 10 lb. of $P_2O_5$ was foliar applied as in Segment E. The crop yield was 124 bushels of corn an acre.

The results indicate that foliar application of ammonium polyphosphate substantially increases the maximum economic planting density and also is much more efficient at increasing crop yield over that achieved by additional ground application of fertilizer over the standard adequate amount. The foregoing results further indicate clearly that foliar application of fertilizer is a very effective supplementary fertilization method in terms of increase in output per quantity of added fertilizer.

EXAMPLE 2

This example indicates the effectiveness of foliar fertilizer application in improving the drought resistance of field crops. An Iowa field was planted with 22,000 corn plants per acre. The field received a total of only 13 inches of rain during the period between planting and harvesting, almost all in the early part of such period. This field was divided into two segments. To one segment was ground applied 250 lb. of nitrogen, 80 lb. of $P_2O_5$ and 150 lb. of $K_2O$. It yielded 80 bushels of corn an acre. The other segment received the same amount of ground-applied fertilizer, but additionally, 10 lb. of $P_2O_5$ was foliar applied. This second segment afforded 120 bushels of corn an acre.

EXAMPLE 3

A field in Minnesota was planted with soybean seed at the rate of 65 lb. of seed an acre. The seed rows were 20 inches apart. From planting to harvesting, the field received only 11 inches of rain. The field was divided into three segments.

Segment A was ground fertilized with 20 lb. of nitrogen, 80 lb. of $P_2O_5$ and 80 lb. of $K_2O$. It afforded 23 bushels of soybeans an acre.

Segment B was ground fertilized with 30 lb. of nitrogen, 120 lb. of $P_2O_5$ and 120 lb. of $K_2O$. It afforded 25 bushels of soybeans an acre.

Segment C received the same ground application of fertilizer as Segment A and, additionally, 12 lb. of $P_2O_5$ was foliar applied. This segment afforded 31 bushels of soybeans an acre.

These results indicate that with soybeans, as with corn, foliar application of fertilizer in accordance with my invention substantially improves the yields of crops subject to partial drought conditions.

EXAMPLE 4

An Illinois corn field was exposed to the microorganism causing corn stalk rot (gibberella). This field received 28 inches of rain during the period between planting and harvesting. The field was divided into two segments.

Segment A of the field received by ground application 250 lb. of nitrogen, 80 lb. of $P_2O_5$ and 180 lb. of $K_2O$. Thirty percent of the corn plants became infected resulting in serious lodging (fall down). The field afforded only 75 bushels of corn an acre.

Segment B received the same ground application of fertilizer as Segment A, but, additionally, 10 lb. of $P_2O_5$ was foliar applied. Only 5% of the corn plants became infected and the crop yield was almost 100 bushels an acre.

This example indicates the effectiveness of foliar application of ammonium polyphosphate in accordance with the instant invention at increasing the resistance of field crops to certain pathogens.

EXAMPLE 5

A Wisconsin field was planted with 35 lb. of malt barley seed an acre. The seed rows were 6 inches apart. The rainfall between seed planting and harvesting was 25 inches. The field was exposed to the microorganism causing barley smut.

Segment A of this field received 15 lb. of nitrogen, 40 lb. of $P_2O_5$ and 40 lb. of $K_2O$. A 20% infection of barley; smut occurred. The yield was 25 bushels an acre.

In Segment B, found application of fertilizer was identical with that of Segment A and, additionally, 10 lb. of $P_2O_5$ was foliar applied one week prior to the exposure to the organism causing barley smut. Infection was less than 5% and the yield was 30 bushels per acre.

This example indicates, again, the effectiveness of foliar application in accordance with my invention at increasing field crop resistance to infectious pathogens.

EXAMPLE 6

An Arkansas corn field was flooded in mid-June. Ten inches of rain fell during a 24-hour period. Twelve days elapsed before the low-lying portions of the field were fully drained off. The planting density for the field for both low lying and high lying portions was 18,000 plants an acre. The entire field had received, prior to flooding a ground application of 80 lb. nitrogen, 80 lb. $P_2O_5$ and 40 lb. of $K_2O$. A high ground portion of the field, which drained off rapidly and hence was not flooded, afforded 110 bushels of corn an acre. One half of the low lying portion of the field afforded 90 bushels an acre. The other half of the low lying portion of the field had received 15 lb. of $P_2O_5$ by foliar application about 10 days prior to the 10-inch rainfall. It afforded 106 bushels an acre.

This demonstrates the effectiveness of foliar fertilizer application at improving the flooding stress resistance of field crops.

EXAMPLE 7

A New York state corn field received a pre-planting application of anhydrous ammonia. The rate of application was equivalent to 175 lb. of nitrogen. Also concomitantly added was 105 lb. of $P_2O_5$ and 180 lb. of $K_2O$. The planting density was 20,000 plants an acre. Because of an exceptionally wet Spring, this level of ammonia application apparently caused a toxic condition in the soil. The wet condition was followed by a six-week drought period. In the one half of the field not receiving foliar fertilizer application, there was a very high incidence of wilted and barren plants. 82% of the plants were barren and the yield was only 30 bushels an acre. The other half of the field received 10 lb./acre of $P_2O_5$ by foliar application. The incidence of barren plants was 20% and the field afforded almost 80 bushels an acre.

I claim:

1. A process for improving the stress resistance of a field crop receiving adequate ground fertilization comprising the foliar application to said crop during the crop growth period of a 10–35 weight percent aqueous ammonium polyphosphate solution at a treating level of 5 to 20 pounds of phosphorous pentoxide per acre.

2. A process in accordance with claim 1 wherein said treating level is 10 to 15 pounds per acre.

3. A process in accordance with claim 1 wherein said solution is a 20 to 30 weight percent solution.

4. A process in accordance with claim 1 wherein said crop is corn.

5. A process in accordance with claim 1 wherein there is present in said solution a salt of at least one essential plant nutrient other than nitrogen and phosphorous.

6. A process in accordance with claim 1 wherein said stress is infectious pathogens and wherein said application precedes exposure to said pathogens by four to ten days.

7. A process in accordance with claim 1 wherein said stress is high planting density and wherein said application is from 6 to 10 weeks after the onset of the crop growth period.

References Cited

UNITED STATES PATENTS 3,087,806    4/1963    Martin _____ 71—29
3,171,733    3/1965    Hignett et al. _____ 71—34X

OTHER REFERENCES

Pironer Tree Maintenance, 1959, pp. 61–63, published by Oxford University Press.

SAMIH N. ZAHARNA, Primary Examiner

B. H. LEVENSON, Assistant Examiner

U.S. Cl. X.R.

47—58; 71—1